US006346163B1

(12) United States Patent
Mizota

(10) Patent No.: US 6,346,163 B1
(45) Date of Patent: Feb. 12, 2002

(54) METHOD AND APPARATUS FOR PRODUCING SHEET MEMBERS

(75) Inventor: Yasuo Mizota, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/533,104

(22) Filed: Mar. 22, 2000

(30) Foreign Application Priority Data

Mar. 31, 1999 (JP) .......................................... 11-090892

(51) Int. Cl.[7] ......................... B32B 31/00; B65H 69/02; B65H 69/06

(52) U.S. Cl. ....................... 156/266; 156/264; 156/512; 156/304.1; 156/558; 156/559

(58) Field of Search ................................ 156/266, 264, 156/512, 304.1, 558, 559

(56) References Cited

U.S. PATENT DOCUMENTS

| | | | |
|---|---|---|---|
| 336,495 A | 2/1886 | Smith | 281/42 |
| 3,345,230 A | * 10/1967 | McClean | 156/181 |
| 4,256,522 A | * 3/1981 | Britton | 156/178 |
| 4,455,189 A | * 6/1984 | Takasuga | 156/502 |
| 5,824,178 A | * 10/1998 | Shingu et al. | 156/265 |

FOREIGN PATENT DOCUMENTS

| | | |
|---|---|---|
| JP | B-46-21931 | 6/1971 |

* cited by examiner

*Primary Examiner*—Linda Gray
(74) *Attorney, Agent, or Firm*—Oliff & Berridge, PLC

(57) ABSTRACT

An integral sheet member is produced by repeating the steps of feeding a predetermined amount of sheet material to a conveyor from a feed position on one side of the conveyor, cutting the sheet material to form a preceding strip which is transferred by the conveyor, and joining a leading end of a successive strip to a trailing end of the preceding strip. According to the invention, the preceding sheet strip has a transfer path which is branched into at least two directions, thereby forming at least two types of preceding strips. The leading end of the succeeding strip is joined to the trailing end of the preceding strip of a selected type, thereby allowing at least two kinds of sheet members to be produced continuously and highly efficiently, with an improved manufacturing flexibility.

7 Claims, 4 Drawing Sheets

110
109
108
107
66b
66a
106
66
75
92
78
79
82
74
85
70
65
69
68
64
55
54
60
30
39
58
52
12
13
23
22
49
P 24
51
45
47
P
44
41
34
37
36
38
29
39
58
13
14
12
11
28
35
30
29
34
30
49
50
22
24
25
21
23

METHOD AND APPARATUS FOR PRODUCING SHEET MEMBERS

BACKGROUND OF THE INVENTION

1. Field of the Invention

The present invention relates to method and apparatus for producing sheet members by successively joining sheet materials having a predetermined length.

2. Description of Related Art

In order to produce integral sheet members such as carcass plies or belt plies of pneumatic tires, it has been a conventional practice that a predetermined amount of sheet material is fed from a predetermined feeding position to a conveyor in a predetermined direction, and is cut into a strip having a predetermined length. Sheet members are successively formed by driving the conveyor to move the strips forwards, and joining the trailing end of a preceding stip to the leading end of a succeeding strip. The sheet members so produced are wound into a roll, transferred to a storage space and stored therein. When the sheet members are to be used, the roll is removed from the storage space to a location in front of a drum, e.g., tire building drum, and unwound from the roll and wound onto the drum.

The conventional method explained above allows continuous production of only one end of sheet members. It is highly desirable to improve the manufacturing flexibility.

SUMMARY OF THE INVENTION

It is therefore a primary object of the present invention to provide improved method and apparatus for continuously producing a plurality of types of sheet members.

According to a first aspect of the present invention, there is provided a method for producing sheet members, wherein integral sheet members are produced by repeating the steps of feeding a predetermined amount of sheet material to a conveyor from a feed position on one side of the conveyor, cutting the sheet material to form a preceding strip which is transferred by the conveyor along a predetermined path, and joining a leading end of a successive strip to a trailing end of the preceding strip. The method according to the present invention further comprises the steps of: branching the transfer path of the preceding sheet strip in at least two directions and thereby providing at least two types of preceding strips; and connecting the leading end of the succeeding strip to the trailing end of the preceding strip of a selected type, thereby continuously producing at least two kinds of sheet members.

According to a second aspect of the present invention, there is provided an apparatus for producing integral sheet members, comprising: a main conveyor for transferring a strip which is made from a sheet material; a feed means arranged on one side of the main conveyor, for feeding a predetermined amount of the sheet material to the main conveyor; a cutter for cutting the sheet material in front of the main conveyor to form a strip to be transferred by the main conveyor; at least two branch conveyors connected to a downstrean side of the main conveyor so that the strip transferred by the main conveyor has a transfer path which is branched into at least two directions to provide at least two types of preceding strips; a joining mechanism for joining a leading end of a succeeding strip to a trailing end of the preceding strips of a selected type at a joining position on the main conveyor: and a controller for controlling the operation of the main conveyor, the branch conveyors, the feed means, the cutter and the joining mechanism, said controller selectively causing the trailing ends of the branched strips to be moved toward and away from the joining position, so as to continuously produce at least two kinds of sheet members.

With the above-mentioned method and apparatus according to the present invention, a predetermined amount of sheet material is fed to a conveyor from a feed position on one side of a conveyor, and is cut to form a preceding strip which is transferred by the conveyor along a predetermined path. The transfer path of the preceding sheet strip is branched into at least two directions, to thereby provide at least two types of preceding strips. The leading end of a successive strip is joined to the trailing end of a preceding strip of a selected type. In this way, at least two kinds of sheet members can be produced continuously and highly efficiently, with an improved manufacturing flexibility.

Further advantageous embodiments of the method and apparatus according to the present invention are defined by the dependent claims.

BRIEF DESCRIPTION OF THE DRAWINGS

The present invention will be explained below in further detail, with reference to the preferred embodiment shown in the drawings, in which.

DETAILED DESCRIPTION OF THE PREFERRED EMBODIMENT

Figure 1:
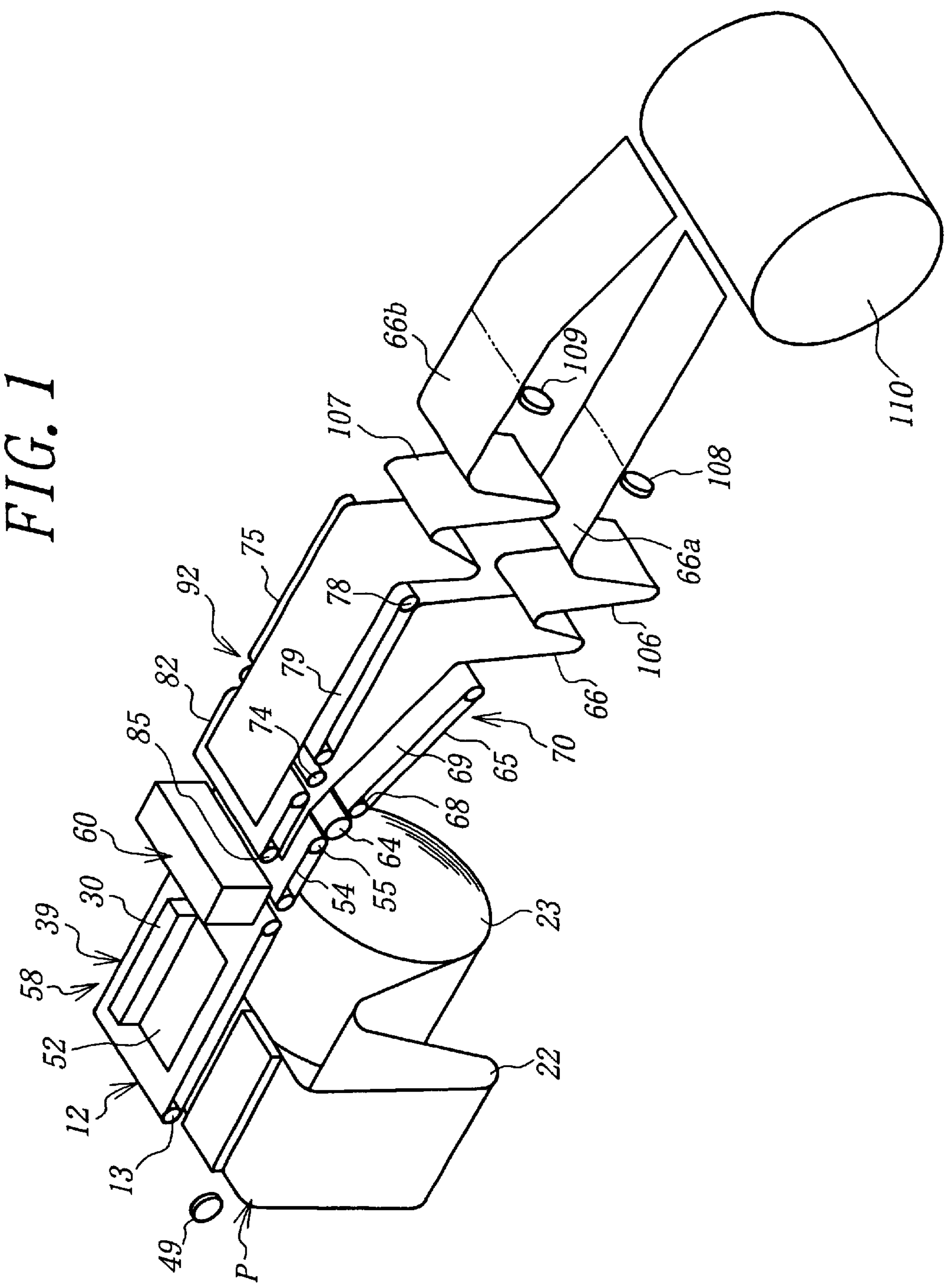
FIG. 1 is a perspective view showing an apparatus for producing sheet members according to one embodiment of the present invention.

Referring now to FIGS. 1 to 4, there is shown an apparatus for continuously producing at least two kinds of sheet members according to one embodiment of the present invention, wherein reference numeral 11 denotes a stationary frame. The frame 11 has a rear end portion which supports a first conveyor 12. The first conveyor 12 comprises a plurality of pulleys 13 which are carried by a pair of shafts 14. The shafts 14 are spaced from each other in the longitudinal direction of the first conveyor 12. The first conveyor 12 further comprises a plurality of narrow endless belts 15 which are arranged in parallel with each other and passed over the respective pulleys 13 on the shafts 14. A drive motor 16 is secured to the frame 11 at a location below the first conveyor 12. The output of the drive motor 16 is s transmitted, through an endless belt 18, to the shaft 14 which is situated on the front end of the first conveyor 12. As a result, when the drive motor 16 is operated and the pulley 13 is thereby driven into rotation, the endless belts 15 are synchronously driven forwards.

Figure 3:
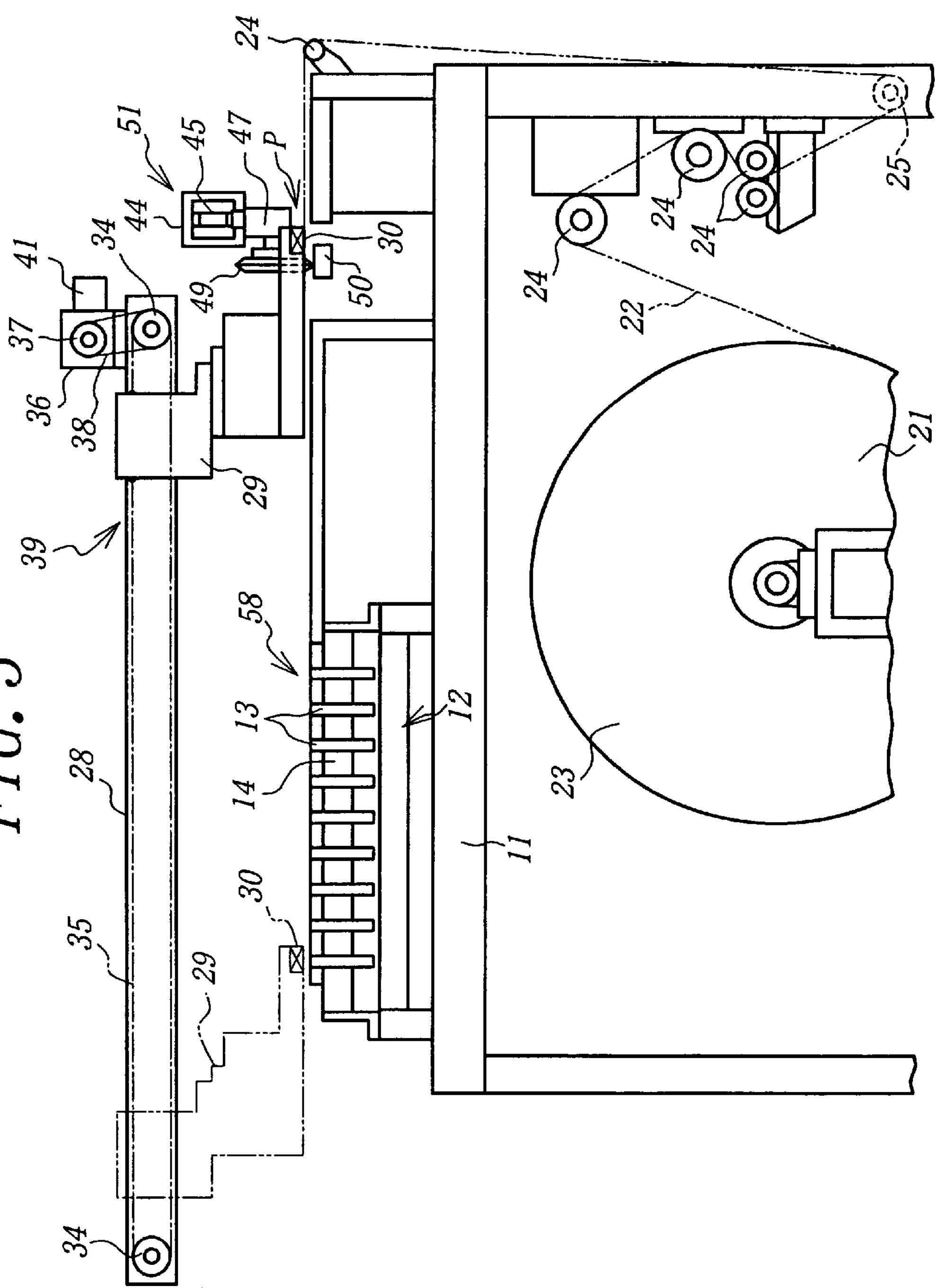
FIG. 3 is a left side view thereof.

A roll stand 21 is arranged immediately below the first conveyor 12. As shown in FIGS. 1 and 3, the roll stand 21 serves to feed an elongate sheet material 22 to the first conveyor 12, as it is unwound from a feed roll 23 which is rotatably supported on the roll stand 21. A number of cords are embedded in the sheet material 22 to extend in the longitudinal direction thereof. The sheet material 22 unwound from the feed roll 23 is fed to a predetermined feed position P on one side of the first conveyor 12, after having been guided by guide rollers 24 and a dancer roller 25 which arc rotatably supported by the stationary frame 11.

Figure 2:
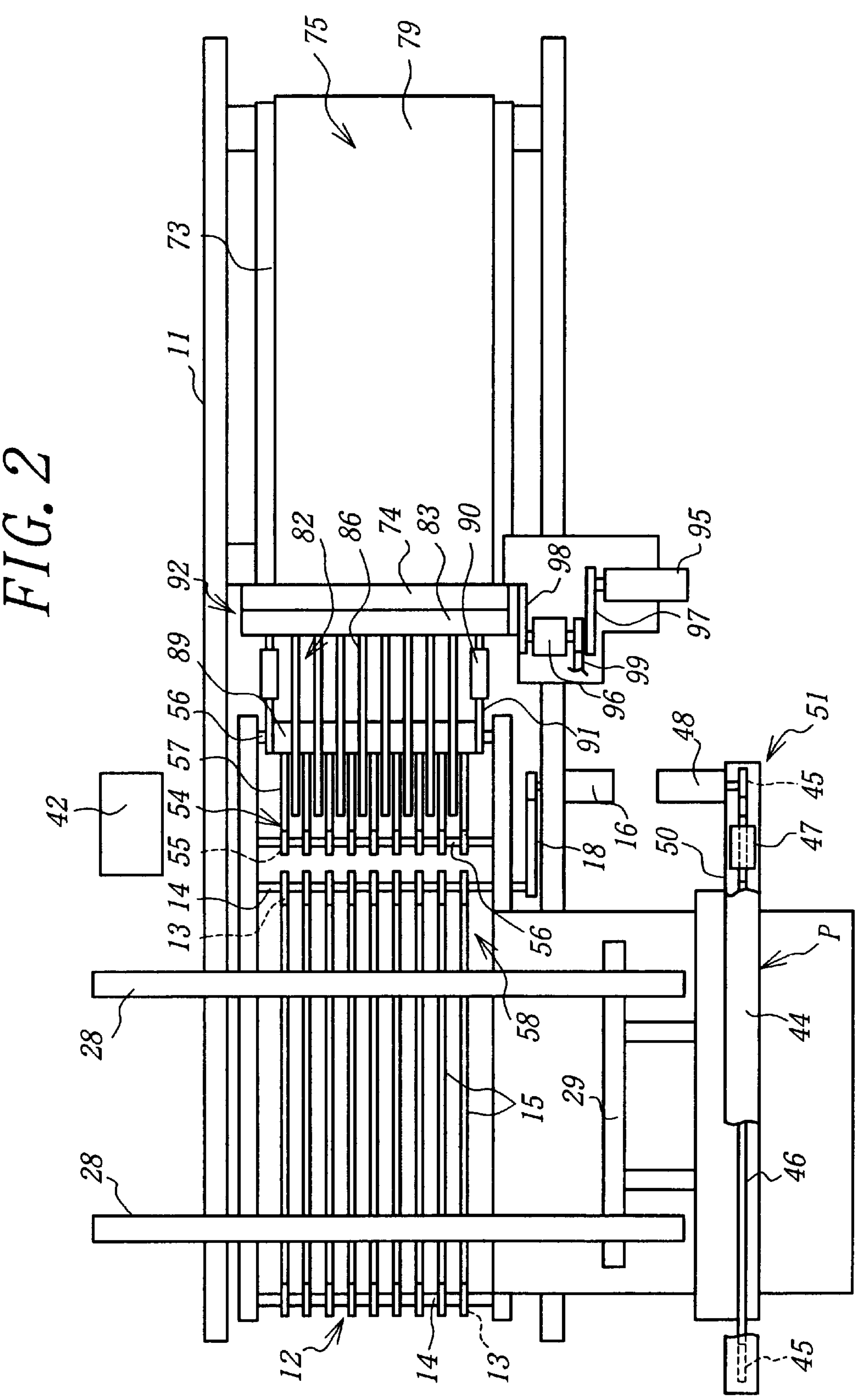
FIG. 2 is a plan view thereof.

A pair of guide beams 28 are fixedly secured to the stationary frame 11. As shown in FIG. 2, the guide beams 28 extend to bridge over the first conveyor 12, in the width direction thereof. As shown in FIG. 3, a carriage 29 is movably supported on the guide beams 28, and provided with a suction head 30 which extends in the longitudinal direction of the first conveyor 12. Although not shown in the drawings, the suction head 30 is connected to a vacuum pump through a valve. Thus, it is possible for the suction head 30 to suck the leading end of the sheet material 22 from an upward position when the valve is open, and to release it when the valve is closed.

As shown in FIG. 3, pulleys 34 are rotatably supported by the guide beams 28 at both ends thereof, and belts 35 arc passed over the pulleys 34 to extend in the longitudinal direction of the respective guide beams 28. Each belt 35 has opposite ends which are connected to the carriage 29. A drive motor 36 is fixedly secured to the guide beam 28 and has an output shaft with a pulley 37 fixedly secured thereto. An endless belt 38 is passed over the pulley 37 and the pulley 34 at one end of the guide beam 28 which is situated close to the above-mentioned predetermined feed position P on one side of the first conveyor 12. It is assumed that the pulleys 34 of the guide beams 28 are drivingly connected to each other by a connection shaft, not shown. Thus, when the drive motor 36 is operated to drive the belt 35. the carriage 29 can be moved between the feed position P and another position which is immediately above the first conveyor 12, while being guided by the guide beams 28.

When, furthermore, the leading end of the sheet material 22 at the feed position P on one side of the first conveyor 12 is sucked by the suction head 30 and the carriage 29 is then moved toward the first conveyor 12, the sheet material 22 is carried by the suction head 30 and transferred from the feed position P toward the first conveyor 12 in a predetermined direction, i.e., a direction which forms a predetermined angle with reference to the first conveyor 12. The direction in which the sheet material 22 is transferred by the suction head 30 may be perpendicular to the first conveyor 12, as in the illustrated embodiment. The above-mentioned carriage 29, suction head 30, pulleys 34, 37, belts 35, 38 and drive motor 36, as a whole, constitute a feed means 39 for feeding a predetermined amount of sheet material 22 from the feed position P toward the first conveyor 12 in the predetermined direction.

An encoder 41 is connected to the drive motor 36 for the carriage 29, for measuring the rotational angle of the drive motor 36. The encoder 41 thus serves to measure the feed amount of the sheet material 22, which is held by the suction head 20, to the first conveyor 12, and generates an output signal which is supplied to a controller 42.

As shown in FIG. 2, a hollow beam 44 is fixedly secured to the stationary frame 11 at a location between the above-mentioned predetermined feed position P and the first conveyor 12, to extend in the longitudinal direction of the latter, and pulleys 45 are rotatably supported at both ends of the hollow beam 44. A belt 46 is passed over the pulleys 45, having its both ends connected to a carriage 47 which is movably supported by the hollow beam 44. A drive motor 48 is secured to the stationary frame 11 and connected to the pulley 45 on the front side so as to move the carriage 47 along the hollow beam 44.

As shown in FIG. 3, a cutter disc 49 is rotatably supported by the carriage 47 so that the cutter disc 49 is movable together with the carriage 47. The cutter disc 49 cooperates with an anvil 50 which extends in parallel with the hollow beam 44, so as to cut the sheet material 22 in its width direction, i.e., in the transfer direction of the first conveyor 12, into a strip 52 having a predetermined length.

The above-mentioned pulleys 45, belt 46, carriage 47, drive motor 48 and cuter disc 49, as a whole, constitutes a cutting means 51 for cutting the sheet material 22 at a location immediately in front of the first conveyor 12, where the sheet material is transferred onto the first conveyor 12. The strip 52 as formed by the cutting means 51 is held by the suction head 30 and moved by the carriage 29 onto the first conveyor 12.

Figure 4:
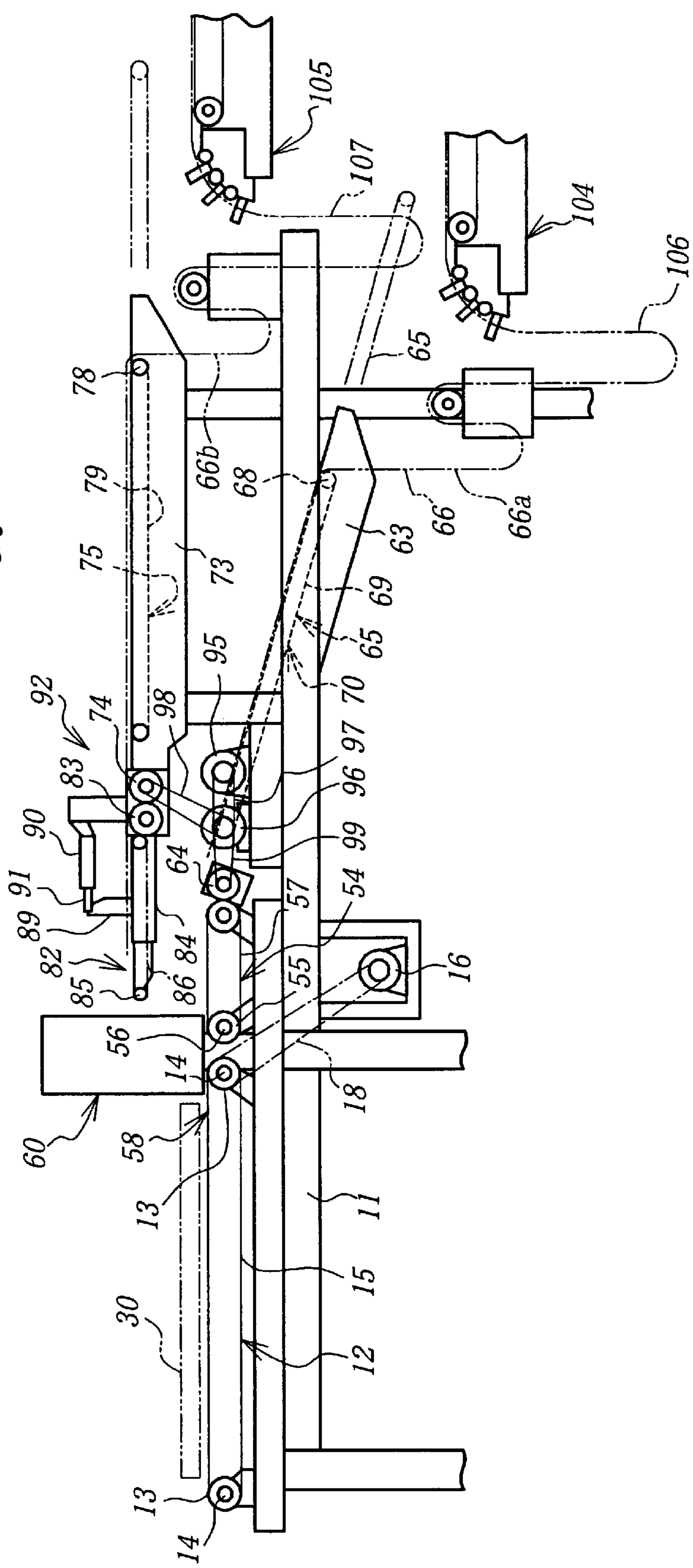
FIG. 4 is a front view thereof.

As shown in FIGS. 1, 2 and 4, a second conveyor 54 is arranged adjacent to the first conveyor 12 on its downstream side, to extend in the same direction and at the same level as the first conveyor 12. The second conveyor 54 include a plurality of pulleys 55 which carried by a pair of freely-rotatable shafts 56 which are spaced from each other in the longitudinal direction of the second conveyor 54. The pulleys 55 carried by each shaft 56 are spaced from each other in the axial direction. A plurality of narrow belts 57 are passed over the corresponding sets of the pulleys 55 to extend in the longitudinal direction of the second conveyor 54. The first conveyor 12 and the second conveyor 54, as a whole, constitute a main belt 58 for moving the strip 52 toward the branch conveyors to be described hereinafter.

A joining device 60 is arranged at a position between the downstream end of the first conveyor 12 and the upstream end of the second conveyor 54. The joining device 60 serves to join the trailing end of a preceding strip 52 on the second conveyor 54 and the leading end of a succeeding strip 52 on the first conveyor 12 with each other, at a joining position between the first and second conveyors 12, 54.

Reference numeral 63 in FIG. 4 denotes a first support frame which is arranged adjacent to the second conveyor 54 and inclined forwards and downwards. The first support frame 63 has a rear end which serves to rotatably support a roller 64 which, in turn, extends in parallel with the shaft 56. A lower conveyor 65 is arranged on the downstream side of the roller 64. The lower conveyor 65 is supported by, and movable along the first support frame 63.

When a relatively short sheet member 66 is formed by joining a plurality of strips 52 and placed on the lower conveyor 65, the lower conveyor 65 is moved forwards by a moving mechanism, not shown, to the position shown by imaginary lines in FIG. 4, so that the leading end of the sheet member 66 is transferred to a first servicer while bypassing a space for festoons to be described hereinafter.

The lower conveyor 65 is comprised of a pair of freely-rotatable pulleys 68 which are spaced from each other in the longitudinal direction, and an endless belt 69 which is passed over the pulleys 68. The above-mentioned roller 64 and the lower conveyor 65, as a whole, constitutes a first branch conveyor 70 which is arranged on the downstream side of the joining device 60.

Reference numeral 73 in FIG. 4 denotes a second support frame which is arranged immediately above the first support frame 63 and fixedly secured to the stationary frame 11. The second support frame 73 has a rear end which serves to rotatably support a roller 74 which, in turn, extends in parallel with the roller 64 of the lower conveyor 65. An upper conveyor 75 is arranged on the downstream side of the roller 74. The upper roller 75 is supported by, and movable along the second support frame 73.

When a relatively short sheet member 66 formed by joining a plurality of strips 52 is placed on the upper conveyor 75, the upper conveyor 75 is moved forwards by a moving mechanism, not shown, to the position shown by imaginary lines in FIG. 4, so that the leading end of the sheet member 66 is transferred to a second servicer while bypassing another space for festoons to be described hereinafter.

The upper conveyor 75 is comprised of a pair of freely-rotatable pulleys 78 which are spaced from each other in the longitudinal direction, and an endless belt 79 which is passed over the pulleys 78. There is also provided a swivel conveyor 82 having a proximal end which is pivotally connected to the rear end of the second support frame 73 so as to extend in the longitudinal direction. The swivel conveyor 82 includes a shaft 83 which is rotatably supported by the second support frame 73 at its rear end, and a plurality of swivel arms 84 extending rearwards from the shaft 83. A pair of pulleys 85 are freely rotatably supported at the proximal end and the distal end of each swing arm 84, and an endless belt 86 is passed over these pulleys 85. The swivel arms 84 and the associated belts 86 are arranged alternately with the narrow belts 57 of the second conveyor 54.

A connector member 89 is arranged as shown in FIGS. 2 and 4, which serves to connect the intermediate portions of all the swivel arms 84 with each other. The connector member 89 is further connected to the distal end of a piston rod 91 in a cylinder device 90 of which the proximal end is connected to the second support frame 73. Thus, by operating the cylinder device 90, the swivel conveyor 82 can be swiveled vertically about the shaft 83, between an upper position which is illustrated by solid lines in FIG. 4 and a lower position, not shown. When the swivel conveyor 82 assumes a lower position, the distal ends of the swivel arms 84 and the associated belts 86 are positioned between the narrow belts 57 of the second conveyor 54 so as to connect the swivel conveyor 82 to the second conveyor 54.

The above-mentioned roller 74, the upper conveyor 75 and the swivel conveyor 82, as a whole, constitutes a second branch conveyor 92 which is arranged on the downstream side of the joining device 60 and immediately above the first branch conveyor 70. The strips 52 successively transferred by the main conveyor 58 are alternately branched in two directions and, thus, alternately supplied to the first and second branch conveyors 70. 92.

A drive mechanism is secured to the stationary frame 11 and comprised of a drive motor 95. The output power of the drive motor 95 is transmitted to a clutch 96 through a belt 97. The clutch 96 is fixedly secured to the stationary frame 11 and functions as a switching mechanism. More particularly, the clutch 96 transmits the output power of the drive motor 95 selectively to the roller 64 of the first branch conveyor 70 through a belt 98, and to the roller 74 of the second branch conveyor 92 through a belt 99, so as to selectively drive one of the first and second branch conveyors 70, 92. By using the drive motor 95 as a common power source for the two branch conveyors 70, 92 in the manner explained above, it is possible to reduce the number of the drive mechanism or drive motor, and to thereby simplify the structure while achieving a cost reduction.

As shown in FIG. 4, a first servicer 104 and a second servicer 105 are arranged on the downstream side of the first branch conveyor 70 and the second branch conveyor 92, respectively. These servicers 104, 105 are supplied with the sheet members 66 from the respective branch conveyors 70, 92. In this instance, festoons 106, 107 of the sheet members 66 are formed between the branch conveyors 70, 92 and the servicers 104, 105, respectively.

A tire building drum 110 is arranged on the downstream side of the servicers 104, 105, as shown in FIG. 1. The sheet members 66 are alternately supplied from the servicers 104, 105 and cut into a predetermined length by cutters 108, 109 before they are alternately and successively wound onto the building drum 110. It is preferred that the length of the sheet members 66 is the same as the peripheral length of the building drum 110.

In addition to the above-mentioned encoder 41, the controller 42 is also connected to the drive motors 16, 36, 48, 95, the switching valve, the joining device 60, the moving mechanisms, the cylinder device 90, the clutch 96, the first and second servicers 104, 105, the cutters 108, 109, the building drum 110, etc. The controller 42 optimizes the production of the sheet members by controlling the main conveyor 58, the feed means 39, the cutter means 51, the joining device 60, the two branch conveyors 70, 92, etc. In this instance, the controller 42 serves to control the movement of the sheet member 66 toward and away from the joining position, to control the amount of sheet material 22 to be supplied to the main conveyor 58, and to select one of the branch conveyors 70, 92 such that the sheet member 66 carried by the selected one of the branch conveyors has a width which is the same as that of the succeeding sheet member 66 carried by the main conveyor 58.

The operation of the apparatus according to the above-mentioned embodiment will be explained below.

In order to continuously produce two kinds of sheet members 66 which are different in width from each other, the roll stand 21 and the feed roll 23, which is fully charged with the sheet material 22, are introduced into s at a location immediately below the main conveyor 58, and the sheet material 22 is then unwound from the feed roll 23 so that the leading end of the sheet material 22 is guided to the predetermined cutting position on one side of the main conveyor 58.

The drive motor 36 is actuated by the controller 42 and the belts 35 are thereby driven so that the carriage 29 is moved along the guide beams 28 toward the feed position P until the suction head 30 reaches a position immediately above the leading end of the sheet material 22. The controller 42 then opens the valve to connect the suction head 30 to the vacuum pump and thereby suck the leading end of the sheet material 22 from the upper side.

The drive motor 36 is further operated to drive the belts 35 in the opposite direction. As a result, the sheet material 22 which has been unwound from the feed roll 23 is moved with the suction head 30, from the feed position P toward the main conveyor 58 in the predetermined direction, i.e., in the direction perpendicular to the first conveyor 12. On this occasion, the encoder 41 detects the rotation of the output shaft of the drive motor 36 to measure the feed amount of the sheet material 22 to the main conveyor 58, and supplies its output signal to the controller 42. When it is detected that a predetermined amount A of the sheet material 22 has been fed to the main conveyor 58, the drive motor 36 is stopped.

The drive motor 42 is then actuated by the controller 42 to drive the belt 46. As a result, the cutter disc 49 is moved integrally with the carriage 47 and cooperates with the anvil 50 at the cutting position to cut the sheet material 22 in its width direction, i.e., in the direction which is in parallel with the transfer direction of the first conveyor 12, to thereby form a strip 52 having a predetermined length A.

The drive motor 36 is then actuated once again, so that the strip 52 held by the suction head 30 is moved toward the main conveyor 58, i.e., to a position above the first conveyor 12. The strip 52 is then released from the suction head 30 by closing the valve and thereby placed on the first conveyor 12.

Subsequently, the drive motor 36 is actuated to return the suction head 30 to the predetermined feed position P. and the valve is opened so that the suction head 30 sucks the leading end of the sheet material 22 which is situated at the feed position P. On this occasion, the drive motor 16 is actuated by the controller 42 so as to drive the narrow belts 15 of the first conveyor 12. Also, the drive motor 95 is actuated by the controller 42 so that the output rotation of the drive motor 95 is transmitted to the roller 64, via the clutch 96, to thereby drive the roller 64. As a result, the strip 52 on the main conveyor 5Sis moved onto the first branch conveyor 70 as a first preceding strip.

Thereafter, in substantially the same way as described above, the drive motor 36 is actuated and the sheet material 22 is moved from the feed position P toward the main conveyor 58. The drive motor 36 is stopped when the encoder 41 detects that another predetermined amount B of the sheet material 22 has been fed to the main conveyor 58, wherein the feed amount B is different from the above-invention feed amount A. Then, the drive motor 48 is actuated so that the cutter disc 49 cooperates with the anvil 50 to cut the sheet material 22 and thereby form a second preceding strip 52 having a length B which is different from the length A of the first preceding strip 52.

On this occasion, the cylinder device 90 is actuated by the controller 42 so that the piston rod 91 is extended, to cause a downward swiveling motion of the swivel conveyor 82 from its initial position. As a result, the belts 86 at the leading end of the swivel conveyor 82 are engaged into the spaces between the narrow belts 57 of the second conveyor 54 to connect the second conveyor 54 with the swivel conveyor 82.

Subsequently, the drive motor 36 is actuated so that the second preceding strip 52 held by the suction head 30 is moved toward the first conveyor 12, and then released from the suction head 30 and thereby transferred onto the main conveyor 58.

The drive motor 36 is then actuated to return the suction head 30 to the feed position P, where the suction head 30 sucks the leading end of the sheet material 22 at the feed position P. On this occasion, the drive motor 16 is actuated by the controller 42 so as to drive the narrow belts 15 of the first conveyor 12. Also, the drive motor 95 is actuated by the controller 42 so that the output rotation of the drive motor 95 is transmitted to the roller 74, via the clutch 96, to thereby drive the roller 74. As a result, the second preceding strip 52 on the main conveyor 58 is moved onto the second branch conveyor 82. The piston rod 91 of the-cylinder device 90 is then retracted so that the swivel conveyor 82 is moved upwards to the initial position.

In this way, the transfer path of the strips 52 is branched into two directions so that the strip 52 of length A and the strip of length B are transferred to the first and second branch conveyors 70, 92, respectively.

In substantially the same way as described above, the drive motor 36 is then actuated to feed the predetermined amount A of the sheet material 22 from the feed position P toward the main conveyor 58. The feed amount of the sheet material 22 is detected by the encoder 41. Thereafter, the sheet material 22 at the cutting position is cut by the cutter disc 49 in its width direction, so as to form a strip 52 having the width A, as a first succeeding strip which is to be joined to the first preceding strip 52 of the same width A.

On this occasion, based on the output signal from the encoder 41, the controller 42 selects either one of the first and second branch conveyors 70, 92 so that the preceding strip 52 on the selected branch conveyor, i.e., the s first preceding strip 52 on the first branch conveyor 70 in the illustrated embodiment, is same in width A as the current succeeding strip 52. It is therefore possible to positively prevent undesired joining of the strip 52 with another strip 52 or sheet member 66 having a different width.

After the succeeding strip 52, which has just been formed as described above, is transferred by the suction head 30 onto the first conveyor 12, the suction head 30 is returned to the feed position P and sucks the leading end of the sheet material 22 at the feed position P. Subsequently, the drive motor 95 is actuated by the controller 42 to drive the roller 64 in the opposite direction, so that the first preceding strip 52 on the first branch conveyor 70 is moved backwards, i.e., toward the joining position immediately below the joining device 60.

At the same time, the drive motor 16 is actuated to drive the first conveyor 12 so that the succeeding strip 52 on the first conveyor 12 is moved toward the joining position. When the trailing end of the first preceding strip 52 and the leading end of the succeeding strip 52 reach the joining position, the drive motors 95 and 16 are stopped.

The trailing end of the first preceding strip 52 and the leading end of the succeeding strip 52 are then joined to each other by the joining device 60, so as to form a sheet member **66*a* having a width A. The succeeding strip 52 which has been joined to the preceding strip 52 now forms the rear part of the sheet member 66*a*** or the rear part of a preceding strip.

The main conveyor 58 and the roller 64 are driven in normal direction so that the sheet member **66*a* in its entirety is moved away from the joining position and transferred onto the first branch conveyor 70. On this occasion, the lower conveyor 65 is moved forwards to the position shown by imaginary lines in FIG. 4, and the roller 64 is then driven so that the leading end of the sheet member 66*a* which has been just formed is transferred onto the first servicer 104, bypassing the space forming the festoon 106. The lower conveyor 65 is then returned to the initial position shown by solid line in FIG. 4**.

In substantially the same way as described above, the drive motor 36 is then actuated so that the suction head 30 feeds the predetermined amount B of the sheet material 22 from the feed position P toward the main conveyor 58. The sheet material 22 is then cut by the cutter disc 49 at the cutting position in order to for another second succeeding strip 52 having a width B. Thereafter, based on the output signal from the encoder 41, the controller 42 selects either one of the first and second branch conveyors 70, 92 so that the preceding strip 52 on the selected branch conveyor, i.e., the second preceding strip 52 on the second branch conveyor 92 in the illustrated embodiment, is same in width B as the current succeeding strip 52. On this occasion, the swivel conveyor 82 is moved downwards to connect the second conveyor 54 with the swivel conveyor 82.

After the succeeding second strip 52, which has just been formed as described above, is transferred by the suction head 30 onto the first conveyor 12, the suction head 30 is returned to the feed position P and sucks the leading end of the sheet material 22 at the feed position P. Subsequently, the drive motor 95 is actuated by the controller 42 to drive the roller 74 in the opposite direction, so that the second preceding strip 52 on the second branch conveyor 92 is moved backwards, i.e., toward the joining position immediately below the joining device 60.

At the same time, the drive motor 16 is actuated to drive the first conveyor 12 so that the succeeding strip 52 on the first conveyor 12 is moved toward the joining position. When the trailing end of the first preceding strip 52 and the leading end of the succeeding strip 52 reach the joining position, the drive motors 95 and 16 are stopped. The trailing end of the s preceding strip 52 and the leading end of the succeeding strip 52 are then joined to each other by the joining device 60, so as to form a sheet member 66*b* having a width B. The succeeding strip 52 which has been joined to the preceding strip 52 now forms the rear part of the sheet member 66*b* or the rear part of a preceding strip.

The main conveyor 58 and the roller 74 are driven in normal direction so that the sheet member 66*b* in its entirety is moved away from the joining position. The sheet member 66*b* is thus transferred onto the second branch conveyor 92, while the swivel conveyor 82 is moved upwards and returned to, and maintained in the initial position. The upper conveyor 75 is moved forwards to the position shown by imaginary lines in FIG. 4, and the roller 74 is then driven so that the leading end of the sheet member 66*b* which has been just formed is transferred onto the second servicer 105, bypassing the space forming the festoon 107 The upper conveyor 75 is then returned to the initial position shown by solid line in FIG. 4.

The above-mentioned operations are repeated to successively produce two types of integral sheet members 66, wherein the controller 42 changes the feed amount of the sheet material 22 between the amounts A and B, and branches the transfer path of the strips 52 into two directions, toward the first and second branch conveyors 70, 92.

Corresponding to the currently formed succeeding strip 52, the controller 42 alternately selects one of the preceding strips 52 or sheet members 66*a,* 66*b* and one of the first and second branch conveyors 70, 92 on which the selected preceding strip or sheet member is carried, such that the succeeding strip 52 is joined to the preceding strip 52 or sheet member 66 which is same in width as the succeeding strip 52. In this way, it is possible to successively produce two types of sheet members 66*a,* 66*b* which are different in width but same in length.

Elongate sheet members 66 are thus successively produced by alternately joining strips 52 to the trailing ends of the respective types of sheet members 66*a,* 66*b*. The sheet member 66*a* on the first servicer 104 is cut by cutter 108 into the length which corresponds to the circumferential length of the building drum 110, and is supplied to the drum 110 and wound thereon. Similarly, the sheet member 66*b* on the second servicer 105 is cut by cutter 109 into the length which corresponds to the circumferential length of the building drum 110, and is supplied to the drum 110 and wound thereon.

Since the elongate sheet members 66 are directly wound onto the building drum 110, it is unnecessary to temporarily wind the sheet members into a roll or to transfer the roll to and from the storage space therefor, thereby making it possible to improve the manufacturing productivity in the factory.

It will be appreciated from the foregoing detailed description that the present invention provides improved method and apparatus for successively producing a plurality of types of sheet members highly efficiently, with an improved flexibility in production.

While the present invention has been described above with reference to specific embodiments, various changes and/or modifications may be made without departing from the scope of the invention.

Thus, for example, in the above-mentioned embodiment, the feed amount of the sheet material 22 is changed between two amounts A and B ad the transfer path of the strip is branched into two directions to produce two types of sheet members. However, the feed amount may be changed among at least three amounts, with the transfer path of the strip branched into at least three directions, so as to successively produce at least three types of sheet members which are different in width from each other. Such change may be repeated according to a predetermined sequence, or the sequence may be random.

The width of the strip in the above-mentioned embodiment is changed depending upon the direction of the branched path, though the width of the strip may be constant irrespectively of the direction of the branched path. Also, the sheet material 22 in the above-mentioned embodiment is fed to the main conveyor 58 in a direction perpendicular for cutting the material and successively forming generally square strips, though the feeding direction of the sheet material 22 may form a predetermined acute angle with reference to the main conveyor 58 so as to successively form strips having a shape of parallelogram.

While the sheet members 66 in the above-mentioned embodiment is are directly wound onto the building drum, the sheet members 66 may be temporarily wound into a roll and stored in a storage space. In this instance, the roll is transferred from the storage space to a location in front of the building drum, and unwound from the roll and wound onto the building drum whenever necessary.

Furthermore, the sheet members 66 may have a length (L/n) which is obtained by dividing the circumferential length (L) of the building drum by an integer (n). In this instance, the sheet members 66 of the number of that integer (n) are successively wound onto the building drum to form one turn.

What is claimed:

1. A method for producing integral sheet members, wherein integral sheet members are produced by repeating the steps of feeding a predetermined amount of sheet material to a conveyor from a feed position on one side of the conveyor, cutting the sheet material to form a preceding strip which is transferred by the conveyor along a predetermined path, and joining a leading end of a successive strip to a trailing end of the preceding strip, said method further comprising the steps of:

branching the transfer path of the preceding sheet strip in at least two directions and thereby providing at least two types of preceding strips; and connecting the leading end of the succeeding strip to the trailing end of the preceding strip of a selected type, thereby continuously producing at least two kinds of sheet members.

2. The method according to claim 1, wherein the leading end of the succeeding strip and the trailing end of the selected preceding strip are guided to a joining position and joined to each other at the joining position.

3. The method according to claim 1, wherein said at least two preceding strips are different from each other in their widths.

4. The method according to claim 3, wherein a predetermined first amount of sheet material is fed to the conveyor when forming a preceding strip, and a predetermined second amount of sheet material is fed to the conveyor when forming a succeeding strip, said second amount being determined such that the succeeding strip has a width which is the same as the width of a selected preceding strip, and the leading end of the succeeding strip and the trailing end of said selected preceding strip are guided to a joining position and are joined to each other.

5. The method according to claim 4, wherein at least two different amounts of the sheet material are alternately fed to the conveyor to successively form the at least two kinds of strips which are different from each other in width.

6. The method according to claim 5, wherein at least three different amounts of the sheet material are successively fed to the conveyor to successively form at least three of strips which are different from each other in width.

7. The method according to claim 1, wherein said sheet material is a rubber sheet material.

* * * * *